United States Patent
Katzourakis et al.

(10) Patent No.: US 12,371,060 B2
(45) Date of Patent: Jul. 29, 2025

(54) MOTION PLANNING CONSTRAINTS FOR AUTONOMOUS VEHICLES

(71) Applicant: Waymo LLC, Mountain View, CA (US)

(72) Inventors: Diomidis Katzourakis, Mountain View, CA (US); John P. Alsterda, Palo Alto, CA (US); Rami Y. Hindiyeh, Pacifica, CA (US); Robert Chen, San Mateo, CA (US); Carson Schultz, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 170 days.

(21) Appl. No.: 17/894,812

(22) Filed: Aug. 24, 2022

(65) Prior Publication Data

US 2024/0025446 A1    Jan. 25, 2024

(30) Foreign Application Priority Data

Jul. 21, 2022    (GR) .............................. 20220100585

(51) Int. Cl.
  *B60W 60/00*    (2020.01)
(52) U.S. Cl.
  CPC ..... *B60W 60/0015* (2020.02); *B60W 2552/05* (2020.02); *B60W 2552/40* (2020.02); *B60W 2555/20* (2020.02); *B60W 2556/10* (2020.02)
(58) Field of Classification Search
  CPC .......... B60W 30/02; B60W 30/18172; B60W 40/06; B60W 40/064; B60W 40/068; B60W 40/02; B60W 50/0098; B60W 60/0015; B60W 60/0018; B60W 60/00182; B60W 60/00184; B60W 2552/05; B60W 2552/35; B60W 2552/40; B60W 2555/20;
(Continued)

(56) References Cited

U.S. PATENT DOCUMENTS

| | | | |
|---|---|---|---|
| 11,498,537 B1 * | 11/2022 | Gaudin | B60T 8/1725 |
| 2022/0351616 A1 * | 11/2022 | Kubin | G01C 21/3461 |

(Continued)

FOREIGN PATENT DOCUMENTS

FR    3091843 A1 *    7/2020    ........ B60W 50/0097

OTHER PUBLICATIONS

English translation of FR3091843 (Year: 2020).*

(Continued)

*Primary Examiner* — Russell Frejd
*Assistant Examiner* — Brandon Z Willis
(74) *Attorney, Agent, or Firm* — Lowenstein Sandler LLP

(57) ABSTRACT

A method includes obtaining road patch type data associated with at least one road patch type, deriving, from the road patch type data, a set of road patch type parameters for the at least one road patch type, generating, based on the set of road patch type parameters, a set of risk metrics, each risk metric of the set of risk metrics corresponding to a respective road patch type parameter of the set of road patch type parameters, identifying, based at least in part on the set of risk metrics, a set of autonomous vehicle (AV) motion planning constraints selected for the at least one road patch type, and providing the set of AV motion planning constraints to update motion planning functionality performed by at least one component of an AV.

20 Claims, 6 Drawing Sheets

(58) Field of Classification Search
CPC ......... B60W 2556/10; B60W 2720/10; B60W 2720/106; B60W 2720/12; B60W 2720/125; G05D 2107/13; G05D 2107/30
See application file for complete search history.

(56) References Cited

U.S. PATENT DOCUMENTS

| | | | |
|---|---|---|---|
| 2023/0147874 A1* | 5/2023 | Govardhanam | G05D 1/617 701/26 |
| 2024/0001962 A1* | 1/2024 | Horita | B60W 40/06 |

OTHER PUBLICATIONS

T. Novi, A. Liniger, R. Capitani & C. Annicchiarico (2019): Real-time control for at-limit handling driving on a predefined path, Vehicle System Dynamics, DOI:10.1080/00423114.2019.1605081, https://doi.org/10.1080/00423114.2019.1605081, Apr. 15, 2019, 31 pages.

* cited by examiner

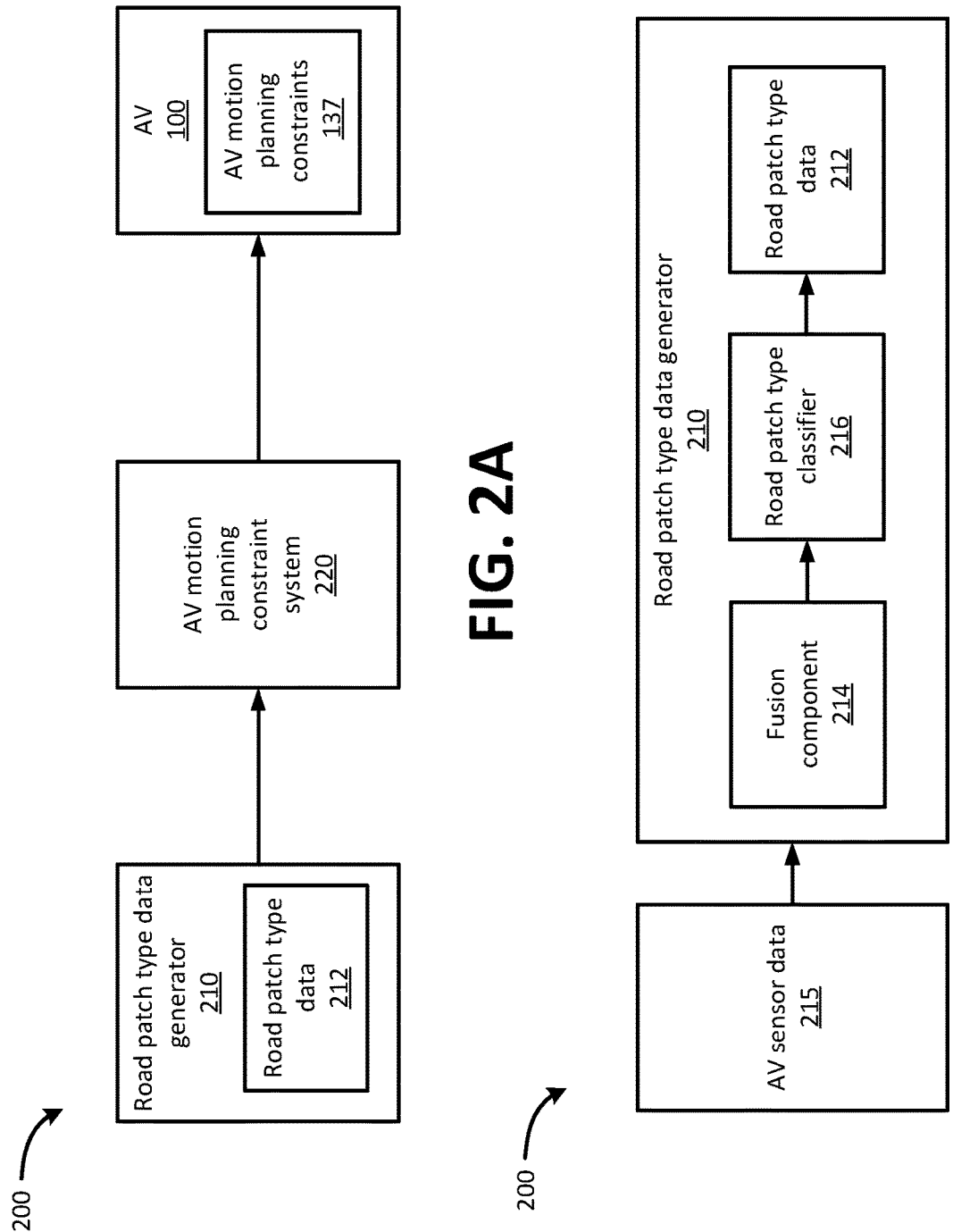

US 12,371,060 B2

MOTION PLANNING CONSTRAINTS FOR AUTONOMOUS VEHICLES

RELATED APPLICATIONS

The present application claims priority to Greek Patent Application 20220100585 filed on Jul. 21, 2022, the entire contents of which are incorporated by reference herein.

TECHNICAL FIELD

The instant specification generally relates to autonomous vehicles (AVs). More specifically, the instant specification relates to motion planning constraints for AVs (e.g., AV control systems).

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, streetlights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

SUMMARY

In one implementation, disclosed is a system including a memory device and a processing device, operatively coupled to the memory device, to perform operations including obtaining road patch type data associated with at least one road patch type, deriving, from the road patch type data, a set of road patch type parameters for the at least one road patch type, generating, based on the set of road patch type parameters, a set of risk metrics, each risk metric of the set of risk metrics corresponding to a respective road patch type parameter of the set of road patch type parameters, identifying, based at least in part on the set of risk metrics, a set of autonomous vehicle (AV) motion planning constraints selected for the at least one road patch type, and providing the set of AV motion planning constraints to update at least one component of an AV. The set of AV motion planning constraints minimizes risk during autonomous operation of the AV for the at least one road patch type.

In another implementation, disclosed is a method. The method includes obtaining, by a processing device, road patch type data associated with at least one road patch type, deriving, by the processing device from the road patch type data, a set of road patch type parameters for the at least one road patch type, generating, by the processing device based on the set of road patch type parameters, a set of risk metrics, each risk metric of the set of risk metrics corresponding to a respective road patch type parameter of the set of road patch type parameters, identifying, by the processing device based at least in part on the set of risk metrics, a set of autonomous vehicle (AV) motion planning constraints selected for the at least one road patch type, and providing, by the processing device, the set of AV motion planning constraints to update motion planning functionality performed by at least one component of an AV. The set of AV motion planning constraints minimizes risk during autonomous operation of the AV for the at least one road patch type.

In yet another implementation, disclosed is a non-transitory computer-readable storage medium having instructions stored thereon that, when executed by a processing device, cause the processing device to perform operations including obtaining road patch type data associated with at least one road patch type corresponding to at least one respective non-standard road state, and deriving, from the road patch type data, a set of road patch type parameters for the at least one road patch type. The set of road patch type parameters for the at least one road patch type includes a set of length frequencies. Each length frequency of the set of length frequencies corresponds to a rate of occurrence of a respective length of the at least one road patch type. The operations further include generating, based on the set of road patch type parameters, a set of risk metrics. Each risk metric of the set of risk metrics corresponds to a respective road patch type parameter of the set of road patch type parameters. Generating the set of risk metrics includes determining a respective risk metric for each length frequency of the set of length frequencies. The operations further include identifying, based at least in part on the set of risk metrics, a set of autonomous vehicle (AV) motion planning constraints selected for the at least one road patch type. The set of AV motion planning constraints includes at least one of: a coefficient of friction, or a set of dynamic constraints. The operations further include providing the set of AV motion planning constraints to update motion planning functionality performed by at least one component of an AV. The set of AV motion planning constraints minimizes risk during autonomous operation of the AV for the at least one road patch type.

BRIEF DESCRIPTION OF THE DRAWINGS

The disclosure is illustrated by way of examples, and not by way of limitation, and can be more fully understood with references to the following detailed description when considered in connection with the figures, in which:

FIGS. 2A-2C are diagrams illustrating an example system for implementing motion planning constraints for autonomous vehicles (AVs), in accordance with some implementations of the present disclosure.

DETAILED DESCRIPTION

Figure 1:
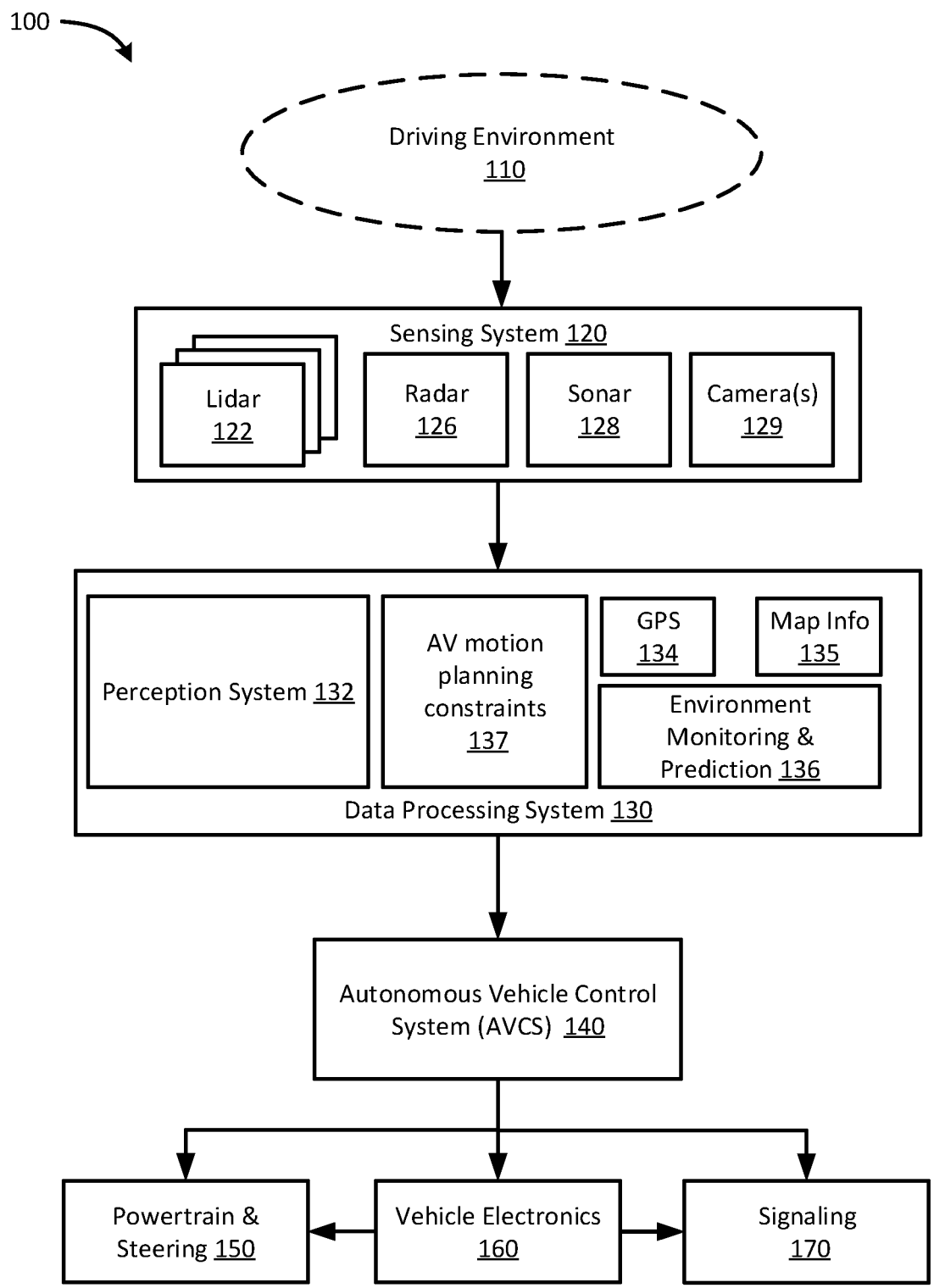
FIG. 1 is a diagram illustrating components of an example autonomous vehicle, in accordance with some implementations of the present disclosure.

An autonomous vehicle (AV) performs vehicle actions, such as braking, steering, and throttling, to move the AV from the starting location to the destination location along the route. The AV can include a planning module ("planner") that receives route data (e.g., from a server) that includes particular roads to travel from the starting location to the destination location. The planner receives sensor data from the perception system (e.g., vehicle sensors) that indicates locations of other objects. The planner uses the sensor data, the route data and predictions about how various objects of the AV driving environment will be positioned to generate planning data. The planning data can include short time horizon routing data, which includes instructions of how to control the AV over a short interval of time (e.g., the next 10 seconds). The planning data may be generated (e.g., regenerated, refreshed) very frequently (e.g., every 100 milliseconds (ms)). By being generated very frequently, the planning data can reflect substantially all the changes in the vehicle or the world (e.g., engine degradation, other objects changing course or speed or appearing suddenly). The planner provides the planning data to a motion control module. The motion control module controls the vehicle systems over the next interval of time (e.g., the next 10 seconds, next 100 ms) based on the planning data. The planner continues generating (e.g., refreshing) new planning data for the subsequent intervals of time based on the route data and the current sensor data from the perception system. The motion control module continues controlling the vehicle based on the new planning data.

A road patch refers to a portion of a road. A road patch can have a road patch type. A road patch type can be a "standard road patch type" or a "non-standard road patch type." A standard road patch type can refer to a road patch having standard conditions. For example, a standard road patch type can be a flat, dry asphalt road patch. A non-standard road patch type can refer to any road patch type that is not a standard road patch type. Examples of non-standard road patch types include at least one of: a wet road patch, an icy road patch, a snowy road patch, a dirt road patch, a gravel road patch, etc. A wet road patch can be a flooded road patch, or a puddle road patch including one or more puddles.

Each road patch type can be defined by a road state. A road state can define one or more characteristics of a road patch having the road patch type. One such characteristic is a coefficient of friction. A coefficient of friction is a dimensionless quantity that measures the amount of friction that can be developed between two surfaces in contact (e.g., the road and tires). A coefficient of friction can be defined by the ratio of the frictional force resisting the motion of two surfaces in contact to the normal force pressing the two surfaces together. One example of a coefficient of friction is a static coefficient of friction. A static coefficient of friction is a coefficient of friction that applies to a static (e.g. motionless) object, and is used to determine how much force is required to cause the object to begin moving. Another example of a coefficient of friction is a kinetic coefficient of friction. A kinetic coefficient of friction is a coefficient of friction that applies to a moving object that is moving relative to the surface it is on. Usually, the coefficient of static friction for an object is greater than the coefficient of kinetic friction for the object, as more force is typically needed to put the object in motion as opposed to maintain the motion of the object. The road state can vary depending on the road patch type. For example, a dry asphalt road patch can have a higher coefficient of static and/or kinetic friction than an icy road patch.

In some instances, during autonomous operation of an autonomous vehicle (AV), the AV can make incorrect assumptions with respect to AV motion planning constraints. AV motion planning constraints can include, for example, the road state and dynamic constraints (e.g., speed and/or acceleration). For example, the AV can believe that it can manage a particular speed and/or acceleration on a road patch having a standard road patch type (e.g., flat dry asphalt road patch), while the road patch in reality has a non-standard road patch type (e.g., wet road patch, icy road patch, snowy road patch, dirt road patch, gravel road patch). There may be increased risk during autonomous operation of an AV due to the inability of the AV to identify a proper coefficient of friction, and thus proper speed and/or acceleration that accounts for the coefficient of friction, for a particular road patch type. For example, there can be an increased risk of collision, loss of motion control (e.g., negotiating a corner too fast for the current road surface), etc. This risk can be amplified in the presence of other agents within the driving environment, such as other vehicles, pedestrians, cyclists, etc.

Aspects of the disclosure address the above challenges, along with others, by implementing motion planning constraints for autonomous vehicles (AVs). For example, implementations described herein can provide for AV motion planning constraint system to identify and output a set of AV motion planning constraints for at least one road patch type, such as a road state and dynamic constraints. The set of AV motion planning constraints is selected to minimize risk during autonomous operation of the AV. For example, the set of AV motion planning constraints can minimize risk of collision and/or minimize loss of motion control. In some implementations, the set of AV motion planning constraints can be used to update motion planning functionality performed by at least one component of the AV (e.g., a data processing system and/or an AV control system). Updating at least one component of the AV can include replacing a set of historical AV motion planning constraints (e.g., previous AV motion planning assumptions) with the set of AV motion planning constraints.

The set of AV motion planning constraints can include at least one of: at least one coefficient of friction (e.g., coefficient of kinetic friction and/or coefficient of static friction), or a set of dynamic constraints. For example, the at least one coefficient of friction can be used to generate the set of dynamic constraints. The set of dynamic constraints can include a steady state vehicle acceleration (e.g., longitudinal and/or lateral). The set of dynamic constraints can further include a traveling speed because speed can have an effect in the severity of an event (e.g., contact with an object) and/or likelihood of exceeding controllability bounds of the AV. The set of dynamic constraints can further include a set of actuation rates. The set of actuation rates can include one or more rates of change regarding respective control parameters of the AV. Examples of control parameters include steering, braking, propulsion, etc. Further details regarding implementing motion planning constraints for AVs will be described below with reference to FIGS. 1-5.

Aspects and implementations disclosed herein provide numerous advantages over existing technologies. For example, the set of AV motion planning constraints identified in accordance with implementations described herein can improve autonomous operation of an AV. For example, the set of AV motion planning constraints can cause the AV to plan appropriate motion trajectories during autonomous operation within a driving environment to minimize risk (e.g., risk of collision or loss of motion control).

FIG. 1 is a diagram illustrating components of an example autonomous vehicle (AV) 100 capable of using motion patterns for object classification and tracking, in accordance with some implementations of the present disclosure. FIG. 1 illustrates operations of the example autonomous vehicle. Autonomous vehicles can include motor vehicles (cars, trucks, buses, motorcycles, all-terrain vehicles, recreational vehicle, any specialized farming or construction vehicles, and the like), aircraft (planes, helicopters, drones, and the like), naval vehicles (ships, boats, yachts, submarines, and the like), or any other self-propelled vehicles (e.g., sidewalk delivery robotic vehicles) capable of being operated in a self-driving mode (without a human input or with a reduced human input).

A driving environment 110 can include any objects (animated or non-animated) located outside the AV, such as roadways, buildings, trees, bushes, sidewalks, bridges, mountains, other vehicles, pedestrians, and so on. The driving environment 110 can be urban, suburban, rural, and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 110 can be located at any distance from the AV, from close distances of several feet (or less) to several miles (or more).

The example AV 100 can include a sensing system 120. The sensing system 120 can include various electromagnetic (e.g., optical) and non-electromagnetic (e.g., acoustic) sensing subsystems and/or devices. The terms "optical" and "light," as referenced throughout this disclosure, are to be understood to encompass any electromagnetic radiation (waves) that can be used in object sensing to facilitate autonomous driving, e.g., distance sensing, velocity sensing, acceleration sensing, rotational motion sensing, and so on. For example, "optical" sensing can utilize a range of light visible to a human eye (e.g., the 380 to 500 nm wavelength range), the ultraviolet range (below 380 nm), the infrared range (above 500 nm), the radio frequency range (above 1 m), etc. In implementations, "optical" and "light" can include any other suitable range of the electromagnetic spectrum.

The sensing system 120 can include a radar unit 126, which can be any system that utilizes radio or microwave frequency signals to sense objects within the driving environment 110 of the AV 100. The radar unit can be configured to sense both the spatial locations of the objects (including their spatial dimensions) and their velocities (e.g., using the Doppler shift technology). Hereinafter, "velocity" refers to both how fast the object is moving (the speed of the object) as well as the direction of the object's motion.

The sensing system 120 can include one or more lidar sensors 122 (e.g., lidar rangefinders), which can be a laser-based unit capable of determining distances (e.g., using ToF technology) to the objects in the driving environment 110. The lidar sensor(s) can utilize wavelengths of electromagnetic waves that are shorter than the wavelength of the radio waves and can, therefore, provide a higher spatial resolution and sensitivity compared with the radar unit. The lidar sensor(s) can include a coherent lidar sensor, such as a frequency-modulated continuous-wave (FMCW) lidar sensor. The lidar sensor(s) can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 units can be mounted on AV, e.g., at different locations separated in space, to provide additional information about a transverse component of the velocity of the reflecting object, as described in more detail below.

The lidar sensor(s) 122 can include one or more laser sources producing and emitting signals and one or more detectors of the signals reflected back from the objects. The lidar sensor(s) 122 can include spectral filters to filter out spurious electromagnetic waves having wavelengths (frequencies) that are different from the wavelengths (frequencies) of the emitted signals. In some implementations, the lidar sensor(s) 122 can include directional filters (e.g., apertures, diffraction gratings, and so on) to filter out electromagnetic waves that can arrive at the detectors along directions different from the retro-reflection directions for the emitted signals. The lidar sensor(s) 122 can use various other optical components (lenses, mirrors, gratings, optical films, interferometers, spectrometers, local oscillators, and the like) to enhance sensing capabilities of the sensors.

In some implementations, the lidar sensor(s) 122 can scan 360-degree in a horizontal direction. In some implementations, the lidar sensor(s) 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full sphere (consisting of two hemispheres). For brevity and conciseness, when a reference to "lidar technology," "lidar sensing," "lidar data," and "lidar," in general, is made in the present disclosure, such reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of AV 100. For example, the data processing system 130 can include a perception system 132. The perception system 132 can be configured to detect and/or track objects in the driving environment 110 and to recognize the objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse, as described below) of such objects. In some implementations, the perception system 132 can use the lidar data in combination with the data captured by the camera(s) 129. In one example, the camera(s) 129 can detect an image of a scene, such as a construction zone scene. Using the data from the camera(s) 129, lidar data, etc., the perception system 132 can be capable of determining the existence of objects within the scene (e.g., cones).

The perception system 132 can further receive information from a GPS transceiver (not shown) configured to obtain information about the position of the AV relative to Earth. The GPS data processing module 134 can use the GPS data in conjunction with the sensing data to help accurately determine location of the AV with respect to fixed objects of the driving environment 110, such as roadways, lane boundaries, intersections, sidewalks, crosswalks, road signs, surrounding buildings, and so on, locations of which can be provided by map information 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the AV relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GPS data processing module 134, the environment monitoring and prediction component 136, and the AV motion planning constraints component 137 can be received by an autonomous driving system, such as AV control system (AVCS) 140. The AVCS 140 can include one or more algorithms that control how the AV is to behave in various driving situations and environments.

For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (cones, rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain and steering 150, vehicle electronics 160, signaling 170, and other systems and components not explicitly shown in FIG. 1. The powertrain and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain and steering 150 (or signaling 170) whereas other instructions output by the AVCS 140 are first delivered to the vehicle electronics 160, which generate commands to the powertrain and steering 150 and/or signaling 170.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain and steering 150 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain and steering 150 to resume the previous speed settings of the vehicle.

As further shown, the data processing system 130 can include a set of AV motion planning constraints 137 selected to minimize risk with respect to at least one road patch type observed by the AV 100 (e.g., using sensor data via the sensing system 120) during autonomous operation of the AV 100. Examples of road patch types include a standard road patch type (e.g., flat, dry asphalt road patch) and non-standard road patch types. Examples of non-standard road patch types include a wet road patch, snowy road patch, icy road patch, dirt road patch, gravel road patch).

The set of AV motion planning constraints 137 define a number of constraints for controlling motion planning functionality performed by at least one component of the AV 100 (e.g., the data processing system 130 and/or the AVCS 140). The set of AV motion planning constraints can, for the at least one road patch type, include at least one of: at least one coefficient of friction, or a set of dynamic constraints. For example, the at least one coefficient of friction can be used to generate the set of dynamic constraints. The set of dynamic constraints can include a steady state vehicle acceleration (e.g., longitudinal and/or lateral). The set of dynamic constraints can also include a traveling speed because speed can have an effect in the severity of an event (e.g., contact with an object) and/or likelihood of exceeding controllability bounds of the AV 100. The set of dynamic constraints can further include a set of actuation rates. The set of actuation rates can include one or more rates of change regarding respective control parameters of the AV 100. Examples of control parameters include steering, braking, propulsion, etc.

As will be described in further detail below, motion planning functionality can be improved by optimizing (e.g., updating) the set of AV motion planning constraints 137 for the at least one road patch type during autonomous operation of the AV 100 (e.g., during real-time operation of the AV 100). That is, at least a subset of the set of AV motion planning constraints 137 can be updated in view of observations made during autonomous operation of the AV 100. Further details regarding a system for implementing motion planning constraints for AVs will now be described below with reference to FIGS. 2A-2C.

Figure 2C:
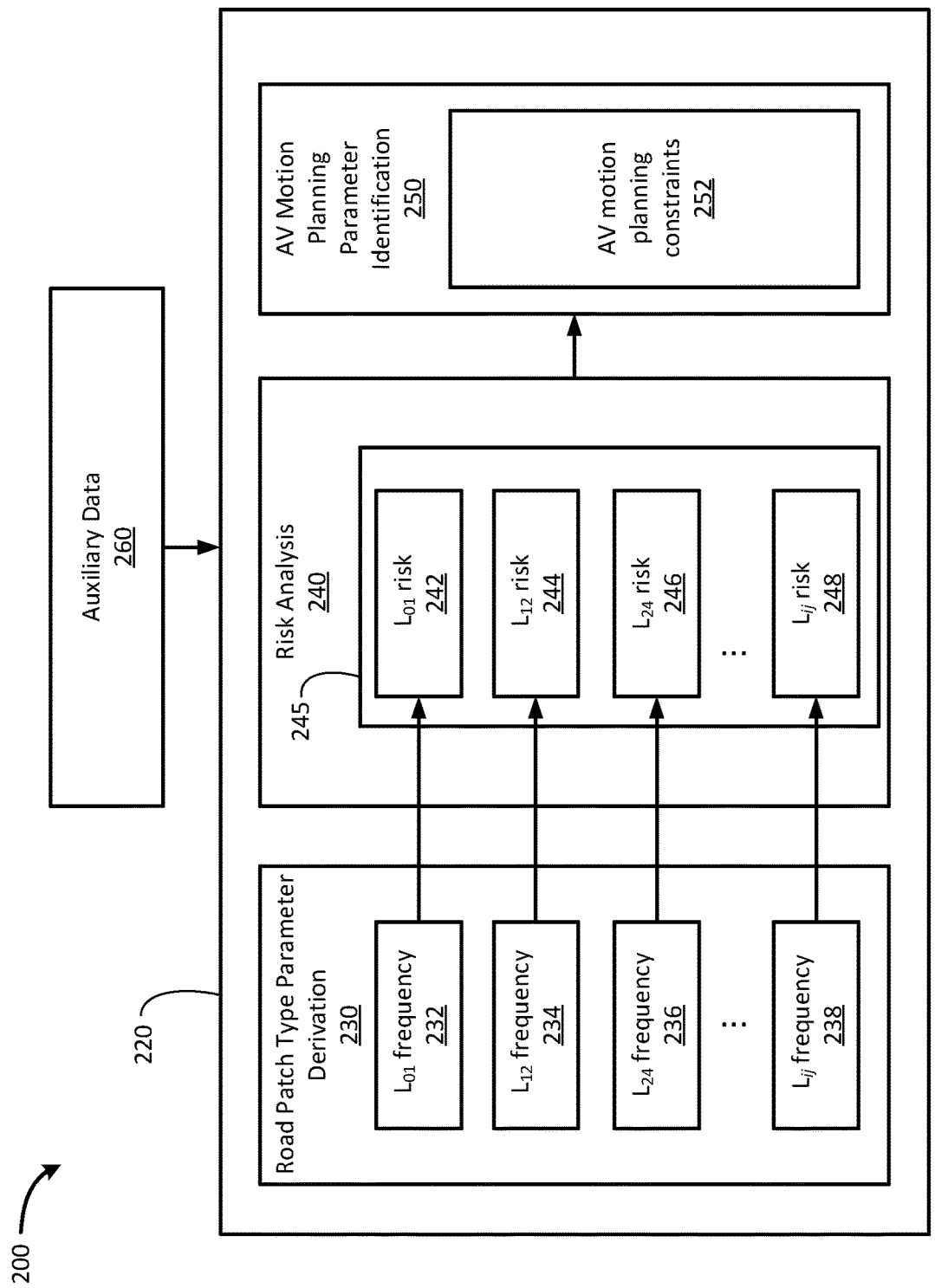

FIGS. 2A-2C are diagrams illustrating an example system 200 for implementing motion planning constraints for AVs, in accordance with some implementations of the present disclosure. As shown in FIG. 2A, the system 200 can include a road patch type data generator 210 configured to generate road patch type data 212 and an AV motion planning constraint system ("system") 220 configured to identify the set of AV motion planning constraints 137 for the AV 100, as described above with reference to FIG. 1.

The road patch type data 212 can include data indicative of road patch types observed by an AV using one or more AV sensors (e.g., the sensing system 120 of the AV 100 of FIG. 1) during operation of the AV within a driving environment (e.g., the driving environment 110 of FIG. 1). The road patch type data generator 210 can use AV sensor data 215 obtained by one or more AV sensors of the AV 100 (e.g., camera, lidar, radar, sonar) to identify the road patch type for an observed road patch. For example, the road patch type data generator 210 can determine (e.g., using a road patch type classifier as described in further detail below) whether an observed road patch is a standard road patch (e.g., dry, flat asphalt), a wet road patchy (e.g., flooded or puddled), an icy road patchy, a snowy road patch, a gravel road patch, a dirt road patch, etc.

Some AV sensors have strengths over other AV sensors. For example, radar can be more precise than lidar in poor visibility conditions (e.g., fog), and lidar can be more precise than radar in clear visibility conditions. Moreover, an AV sensor can be defective or broken and/or noise can decrease the reliability of sensor data generated by a single sensor. To reduce uncertainty and improve AV perception, the AV sensor data 215 can include sensor data obtained from multiple AV sensors.

To handle sensor data obtained from multiple AV sensors, in some implementations and as shown in FIG. 2B, the road patch type data generator 210 can include a sensor data fusion ("fusion") component 214. The fusion component 214 is configured to combine the AV sensor data 215 from multiple AV sensors to reduce uncertainty in the observations made by the AV 100.

In some implementations, and as further shown in FIG. 2B, the road patch type data generator 210 can further include a road patch type classifier 216. The road patch type classifier 216 is configured to perform a machine learning classification technique, based on the AV sensor data 215, to categorize a road patch into a respective road patch type class of a set of road patch type classes. For example, the output of the fusion component 214 can be used by the road patch type classifier 216 to perform the machine learning classification technique. For example, the road patch type classifier 216 can use a machine learning model trained on training data including historical AV sensor data indicative of road patches and obtained by one or more AV sensors, and data (e.g., a label) identifying a type of each indicated road patch. Any other suitable machine learning classification technique can be used in accordance with implementations described herein.

To identify the set of AV motion planning constraints 137, the system 220 can obtain the road patch type data 212 and generate the set of AV motion planning constraints 137 based at least in part on the road patch type data 212. In some implementations, and as shown in FIG. 2C, the system 220 can include a road patch type parameter derivation component 230, a risk analysis component 240, and an AV motion planning constraint identification component 250.

The road patch type parameter derivation component 230 can derive (e.g., generate), from the road patch type data, a set of road patch type parameters for the at least one road patch type. The set of road patch type parameters can reflect road patch observations made by the AV 100 during autonomous operation within the driving environment for road patches classified as having particular road patch types. In some implementations, the set of road patch type parameters can include, for each road patch type, a respective set of length frequencies. A length frequency of a set of length frequencies for a road patch type quantifies a frequency of occurrence of a length of road patches that are classified as having the road patch type. Instead of having a length frequency for individual lengths, a length frequency can be defined for a range of lengths. Accordingly, a length frequency for a road patch type can define the rate of occurrence of a corresponding individual length of the road patch type, or the rate of occurrence of a corresponding range of length of the road patch type.

For example, as shown in FIG. 2C, the set of length frequency values can include, for a road patch observed by the AV 100 and classified as having the road patch type, a frequency of the road patch type having a length less than 1 meter (m), $L_{01}$ frequency 232, a frequency of the road patch type having a length greater than or equal to 1 m and less than 2 m, $L_{12}$ frequency 234, a frequency of the road patch type having a length greater than or equal to 2 m and less than 4 m, $L_{24}$ frequency 236 . . . , and a frequency of the road patch type having a length greater than or equal to i m and less than j m (where i,j are positive integers), $L_{ij}$ frequency 238. Illustratively, for a puddle road patch type, the $L_{01}$ frequency 232 can reflect a rate of observing a road patch of a length of less than 1 m classified as having the puddle road patch type, the $L_{12}$ frequency 234 can reflect a rate of observing a road patch of a length greater than or equal to 1 m and less than 2 m classified as having the puddle road patch type, etc.

The set of length frequency values can be updated on a "rolling" basis during operation of the AV (e.g., in real-time). That is, each occurrence of a road patch type having a particular length can be counted during operation of the AV, which can then be used to update the corresponding length frequency value. Illustratively, upon observing an icy road patch having a length of 3 m, the length frequency value for an icy road patch having a length between 2 m and 4 m can be updated.

The risk analysis component 240 can then generate, based on the set of road patch type parameters, a set of risk metrics 245. The set of risk metrics 245 can include a number of risk metrics reflecting an amount of risk during autonomous operation of the AV for the at least one road patch type (e.g., risk of collision and/or risk of loss of motion control). In some implementations, generating the set of risk metrics 245 includes determining a respective risk metric for each length frequency value. For example, as shown in FIG. 2C, the set of risk metrics 245 can include risk metrics $L_{01}$ risk 242 through $L_{ij}$ risk 248, where each of the risk metrics $L_{01}$ risk 242 through $L_{ij}$ risk 248 is generated from a respective one of the length frequency values $L_{01}$ 232 through $L_{ij}$ 238. The combination of the risk metrics of the set of risk metrics 245 can be used to calculate at least one probability of at least one risk event (e.g., risk of collision and/or risk of loss of motion control). Illustratively, if there are many wet road patches observed having long lengths, then the probability of a risk of collision and/or the probability of a risk of loss of motion control can be higher as compared to if there are fewer wet road patches observed having long lengths.

The AV motion planning constraint identification component 250 is configured to identify, based at least in part on the set of risk metrics 245, a set of AV motion planning constraints 252 selected for the at least one road patch type. For example, the set of AV motion planning constraints 252 can include one or more AV motion planning constraints selected to minimize risk during autonomous operation of the AV for the at least one road patch type. In some implementations, the AV motion planning constraint identification component 250 identifies the set of AV motion planning constraints 252 in real-time during operation of the AV 100.

In some implementations, the set of AV motion planning constraints 252 can include, for the at least one road patch type, at least one of: a coefficient of friction, or a set of dynamic constraints for minimizing risk during autonomous operation of the AV for the at least one road patch type. For example, the set of dynamic constraints can include at least one of a speed or an acceleration. Illustratively, if the road patch type is one in which the coefficient of friction is lower than a standard road patch (e.g., an icy road instead of a flat, dry asphalt road), then the AV motion planning constraint identification component 250 can select an appropriate coefficient of friction to use as an AV motion planning constraint for the icy road. Additionally, the AV motion planning constraint identification component 250 can select an appropriate speed and/or acceleration to use as one or more additional AV motion planning constraints for safe operation with respect to the icy road.

In some implementations, the set of AV motion planning constraints 252 for each road patch type is predetermined. For example, the set of AV motion planning constraints 252 can be experimentally determined for each road patch type, and stored in a motion planning constraint table maintained by the system 220. Additionally or alternatively, at least one constraint of the set of AV motion planning constraints 252 can be derived from mathematical relationships or formulas. For example, relationships can exist between the coefficient of friction for a road patch type and a solution space for a suitable set of dynamic constraints (e.g., speed and/or acceleration) for the road patch type.

The greater the magnitude of the coefficient of friction, the larger the size of the solution space for the suitable set of dynamic constraints. For example, a higher coefficient of friction offers greater friction between the road and the tires of the AV 100, and thus increases the number of safe speeds and/or accelerations for planning trajectories. In contrast, the smaller the magnitude of the coefficient of friction, the smaller the size of the solution space for the suitable set of dynamic constraints. For example, a lower coefficient of friction offers lower friction between the road and the tires of the AV 100, and thus decreases the number of safe speeds and/or accelerations for planning trajectories. Accordingly, the magnitude of the coefficient of friction for a road patch type can directly correlate with the size of the solution space for a suitable set of dynamic constraints (e.g., speed and/or acceleration) for the road patch type.

In some implementations, the set of road patch type parameters can be initially defined with a set of initial road patch type parameters. For example, the set of initial road patch type parameters can include a set of initial length frequency values. The set of road patch type parameters can be made by making initial assumptions about the road patch type within a driving environment. For example, for more conservative operation of the AV 100, the set of initial length frequency values can assume a non-standard road patch type (e.g., wet road patch). If, over time, the AV 100 observes mostly road patches having the standard road patch type (e.g., flat, dry asphalt road patches), then at least a portion of the length frequency values will decrease over time. In turn, the set of risk metrics 245 will change to indicate a lower amount of risk, and the set of AV motion planning constraints 252 (e.g., coefficient of friction and/or set of dynamic constraints) can be updated for optimized AV operation in accordance with the standard road patch type.

In some implementations, and as shown in FIG. 2C, system 220 can further receive auxiliary data 260. The auxiliary data 260 can include data, in addition to the road patch type data 212 used to generate the set of risk metrics 245, which can be used by the system 220. For example, the auxiliary data 260 can be used by the system 220 for guidance if the road patch type data 212 and/or set of risk metrics 245 is/are untrustworthy (e.g., the road patch type data 212 is inconclusive or insufficient). For example, it may be the case that the road patch type classifier 216 is unable to classify a road patch type for at least a portion of the observed road patches. Accordingly, the auxiliary data 260 can provide assistance with respect to selecting appropriate AV motion planning constraints of the set of AV motion planning constraints 252.

The auxiliary data 260 can include a set of historical AV motion planning constraints. For example, the auxiliary data 260 can include at least one of: a currently used coefficient of friction, a historical rate of exceeding the currently used coefficient of friction, or an estimated coefficient of friction for the at least one road patch type (e.g., based on an achieved AV response).

Additionally or alternatively, the auxiliary data 260 can include a historical rate of encountering other agents within a driving environment. Other agents can include other vehicles, pedestrians, cyclists, etc. The historical rate of encountering other agents within the driving environment can be used by the system 220 to determine the risk of collision with another agent within the driving environment. For example, if the driving environment within which the AV 100 is operating is historically known to have a relatively large number of agents (e.g., a section of road within a major city), then the risk of hitting an agent may be higher than compared to a driving environment that is historically known to have a relatively low number of agents (e.g., a section of road within a lower populated rural area). It may be inefficient to constrain the operation of the AV in a driving environment with a low number of agents, since the risk of collision is inherently low (ceteris paribus). Accordingly, the set of dynamic constraints in a driving environment that historically has a large number of agents may be different from the set of dynamic constraints in a driving environment that historically has a low number of agents.

Additionally or alternatively, the auxiliary data 260 can include weather information. For example, if the road patch type data 212 indicates that an observed road patch has an icy road patch type, but the weather information indicates that the ambient temperature is too high to support icy roads, then the road patch type data generator 210 (e.g., road patch type classifier 216) may be assigning an incorrect road patch type to the observed road patch. Thus, the weather information can be used to determine that the road patch has a higher coefficient of friction than what would have been determined directly from the road patch type data 212.

As shown in FIG. 2A, the system 220 can then provide the set of AV motion planning constraints 252 to update motion planning functionality performed by at least one component of the AV 100. For example, the set of AV motion planning constraints 252 can update one or more AV motion planning constraints of the set of motion planning constraints 137, which can be maintained by the data processing system 130 or the AVCS 140. The data processing system 130 and/or the AVCS 140 can then use the set of AV motion planning constraints 252 to cause the AV 100 to follow suitable trajectories (e.g., trajectories that are feasible for the coefficient of friction and/or set of dynamic constraints). For example, if the AV 100 predicts that an incoming road patch could be a wet road patch (because of the increased frequency of encountering wet road patches), then the AV 100 will operate using a set of AV motion planning constraints 252 for the wet road patch. The set of AV motion planning constraints 252 for the wet road patch can be used to prevent exceeding the (road-tire) friction coefficient (i.e., plan within the braking and/or cornering capabilities) and/or control the speed to minimize the risk of hydroplaning, since the likelihood of hydroplaning can increase as a function of traveling speed.

Figure 3:
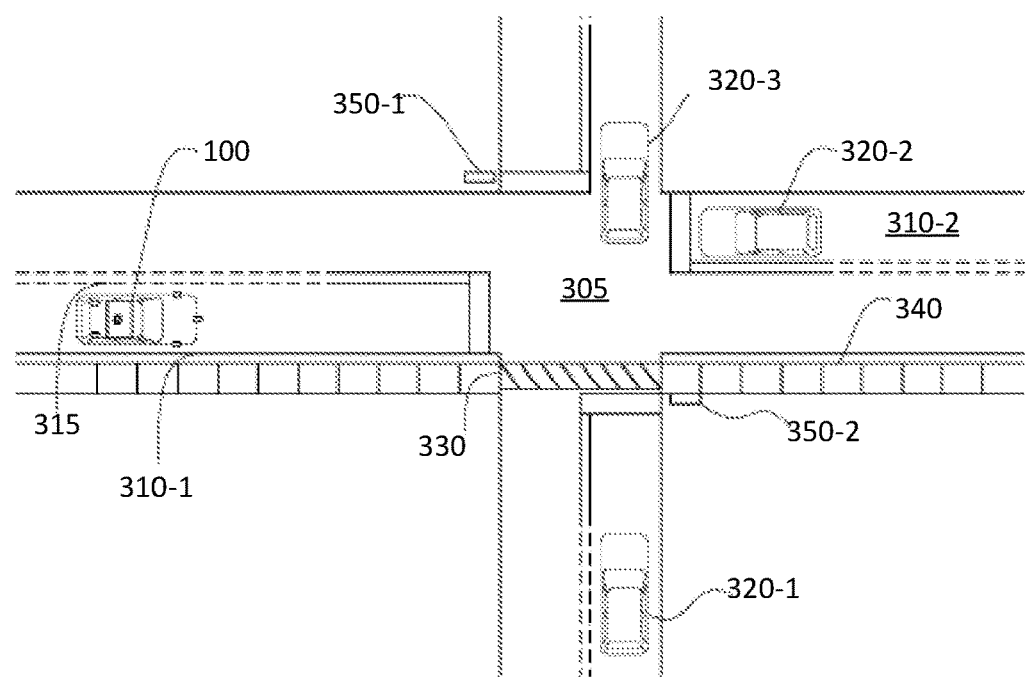
FIG. 3 is a diagram illustrating an example driving environment, in accordance with some implementations of the present disclosure.

FIG. 3 is a diagram illustrating an example driving environment 300, in accordance with some implementations of the present disclosure. As shown, the driving environment 300 includes the AV 100, intersection 305, lanes of a road including lanes 310-1 and 310-2, a lane divider line 315 dividing the lanes 310-1 and 310-2, agent vehicles 320-1 through 320-3, crosswalk 330, sidewalk 340, and stop signs 350-1 and 350-2. Although each of the agent vehicles 320-1 through 320-3 are depicted as cars, the agent vehicles 320-1 through 320-3 can be any suitable vehicle (e.g., motorcycle, van, bus).

The lane 310-1 includes a number of road patches that can be observed by the AV 100 during autonomous operation. As described above with reference to FIGS. 2A-2C, each road patch can be associated with a respective road patch type (e.g., using a road patch type classifier) to obtain road patch type data for at least one road patch type. As described above with reference to FIGS. 2A-2C, a set of road patch type parameters for the at least one road patch type (e.g., a set of length frequency values for at least one road patch type) can be derived from the road patch type data as the AV 100 drives on the road via the lane 310-1. As described above with reference to FIGS. 2A-2C, a set of risk metrics can be generated based on the set of road patch type parameters as the AV 100 drives on the road via the lane 310-1. As described above with reference to FIGS. 2A-2C, a set of AV motion planning constraints selected for the at least one road patch type can be identified based at least in part on the set of risk metrics. The set of AV motion planning constraints can be identified to minimize risk during operation of the AV 100 while driving within the lane 310-1 (e.g., risk of collision and/or risk of loss of control). As described above with reference to FIGS. 2A-2C, the set of AV motion planning constraints can be provided (e.g., during real-time operation) to update motion planning functionality performed by at least one component of the AV 100 (e.g., the data processing system 130 and/or the AVCS 140 of FIG. 1). For example, the set of AV motion planning constraints can include a coefficient of friction and/or a set of dynamic constraints (e.g., speed and/or acceleration). Illustratively, if the AV 100 observes that the lane 310-1 includes a larger number of road patches having a wet road patch type, the AV 100 can selected AV motion planning constraints that are suitable for motion planning for minimizing risk during operation of the AV 100 while driving on the wet road patches of the lane 310-1. Further details regarding FIG. 3 are described above with reference to FIGS. 2A-2C, and will be described in further detail below with reference to FIGS. 4A-4B.

Figure 4A:
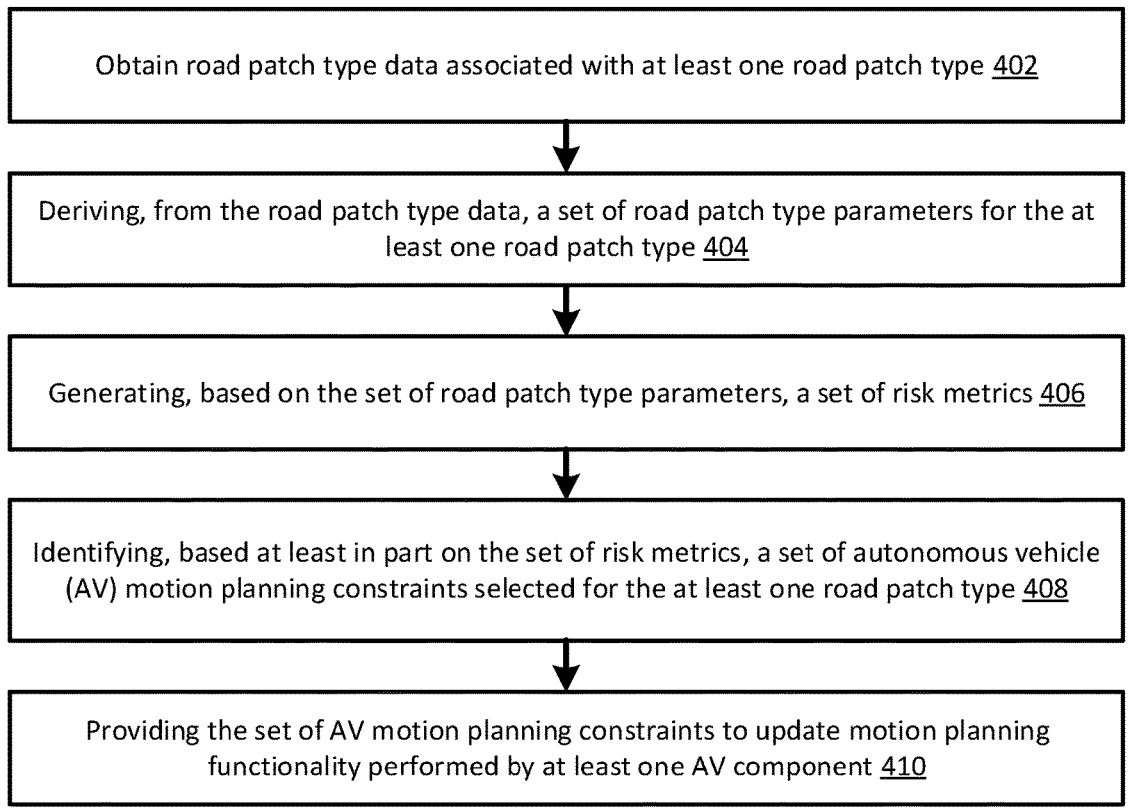
FIGS. 4A-4B are flow diagrams of example methods of implementing motion planning constraints for autonomous vehicles (AVs), in accordance with some implementations of the present disclosure.

FIG. 4A is a flow diagram of an example method 400 of implementing motion planning constraints for AVs, in accordance with some implementations of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an AV motion planning constraint system (e.g., the system 220 of FIG. 2). Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 402, processing logic obtains road patch type data associated with at least one road patch type. In some implementations, the at least one road patch type corresponds to at least one respective non-standard road state. For example, the at least one road patch type can comprise at least one of: a wet road patch, an icy road patch, a snowy road patch, a dirt road patch, or a gravel road patch.

In some implementations, obtaining the road patch type data includes receiving AV sensor data of a road patch obtained by one or more AV sensors, and generating the road patch type data for the road patch using machine learning. For example, generating the road patch type can include using a road patch type classifier to classify the road patch. In some implementations, obtaining the road patch type data includes fusing AV sensor data obtained by multiple AV sensors (e.g., camera, lidar, radar) to obtain fused sensor data, and generating the road patch type data using the fused sensor data.

At operation 404, processing logic derives, from the road patch type data, a set of road patch type parameters for the at least one road patch type. In some implementations, the set of road patch type parameters for the at least one road patch type includes a set of length frequencies. A length frequency of a set of length frequencies for a road patch type quantifies how often the AV observes a length of road patches classified as having the road patch type. Instead of having a length frequency for individual lengths, a length frequency can be defined for a range of lengths. The set of road patch type parameters can be updated in real-time during operation of the AV. Accordingly, a length frequency for a road patch type can define the rate of occurrence of a corresponding individual length of the road patch type, or the rate of occurrence of a corresponding range of length of the road patch type, which can be used to update a respective length frequency of the set of length frequencies for the road patch type during autonomous operation of the AV (e.g., in real-time).

At operation 406, processing logic generates, based on the set of road patch type parameters, a set of risk metrics. In some implementations, generating the set of risk metrics includes determining, for each length frequency of a set of length frequencies for at least one road patch type, a respective risk metric. The combination of the risk metrics of the set of risk metrics can be used to calculate at least one probability of at least one risk event (e.g., risk of collision and/or risk of loss of motion control). Illustratively, if there are many wet road patches observed having long lengths, then the probability of a risk of collision and/or the probability of a risk of loss of motion control can be higher as compared to if there are fewer wet road patches observed having long lengths.

At operation 408, processing logic identifies, based at least in part on the set of risk metrics, a set of autonomous vehicle (AV) motion planning constraints selected for the at least one road patch type. In some implementations, the set of AV motion planning constraints includes, for the at least one road patch type, at least one of: at least one coefficient of friction or a set of dynamic constraints. The set of dynamic constraints can include a steady state vehicle acceleration (e.g., longitudinal and/or lateral). The set of dynamic constraints can further include a traveling speed because speed can have an effect in the severity of an event (e.g., contact with an object) and/or likelihood of exceeding controllability bounds of the AV. The set of dynamic constraints can further include a set of actuation rates. The set of actuation rates can include one or more rates of change regarding respective control parameters of the AV. Examples of control parameters include steering, braking, propulsion, etc.

In some implementations, identifying the set of AV motion planning constraints further includes obtaining auxiliary data for identifying the set of AV motion planning constraints, and identifying the set of AV motion planning constraints based on the set of risk metrics and the set of auxiliary data. For example, the auxiliary data can include at least one of: a set of historical AV motion planning constraints, a historical rate of encountering other agents within a driving environment, or weather information. It may be the case that the road patch type data obtained at operation 402 is faulty, defective, or otherwise untrustworthy. Thus, the auxiliary data can be used in conjunction with the set of risk metrics to improve the selection of the set of AV motion planning constraints. For example, weather information including ambient temperature can be used to determine whether the road patch type data is indicative of a realistic road patch type (e.g., if it is well above freezing but the classifier has classified a road patch as having an icy road patch type, then the classifier may be inaccurately classified road patch types).

At operation 410, processing logic provides the set of AV motion planning constraints to update motion planning functionality performed by at least one AV component. For example, the at least one AV component can include at least one of the data processing system or the AVCS (e.g., the data processing system 130 and/or the AVCS 140 of FIG. 1). The set of AV motion planning constraints can be used by the at least one AV component to plan and execute suitable motion trajectories for the AV to take in a manner that reduces risk during the autonomous operation of the AV. For example, if the set of AV motion planning constraints includes a low coefficient of friction indicative of an icy road patch, the at least one AV component can use the coefficient indicative of the icy road patch to determine an appropriate speed, acceleration, etc. for minimizing risk during operation of the AV (e.g., risk of collision and/or risk of loss of control). Further details regarding operations 402-410 are described above with reference to FIGS. 1-3.

Figure 4B:
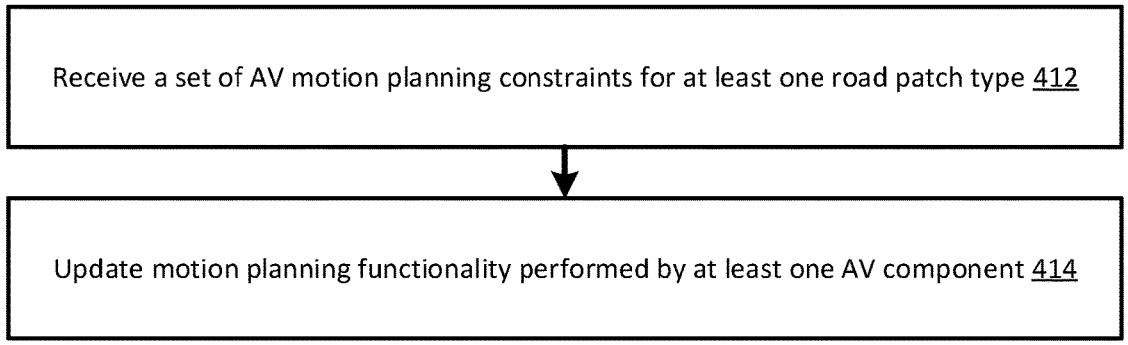

FIG. 4B is a flow diagram of an example method 400B of implementing motion planning constraints for AVs, in accordance with some implementations of the present disclosure. The method 400B can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the processing logic can be included within an AV (e.g., the AV 100 of FIGS. 1-2). Although shown in a particular sequence or order, unless otherwise specified, the order of the processes can be modified. Thus, the illustrated implementations should be understood only as examples, and the illustrated processes can be performed in a different order, and some processes can be performed in parallel. Additionally, one or more processes can be omitted in various implementations. Thus, not all processes are required in every implementation. Other process flows are possible.

At operation 412, processing logic receives a set of AV motion planning constraints for at least one road patch type. For example, the set of AV motion planning constraints can be the set of AV motion planning constraints identified at operation 408 of FIG. 4A.

At operation 414, processing logic updates motion planning functionality performed by at least one AV component. For example, the at least one AV component can include at least one of the data processing system or the AVCS (e.g., the data processing system 130 and/or the AVCS 140 of FIG. 1). The set of AV motion planning constraints can be used by the at least one AV component to plan and execute suitable motion trajectories for the AV to take in a manner that reduces risk during the autonomous operation of the AV. For example, if the set of AV motion planning constraints includes a low coefficient of friction indicative of an icy road patch, the at least one AV component can use the coefficient indicative of the icy road patch to determine an appropriate speed, acceleration, etc. for minimizing risk during operation of the AV (e.g., risk of collision and/or risk of loss of control). Further details regarding operations 412-414 are described above with reference to FIGS. 1-4A.

Figure 5:
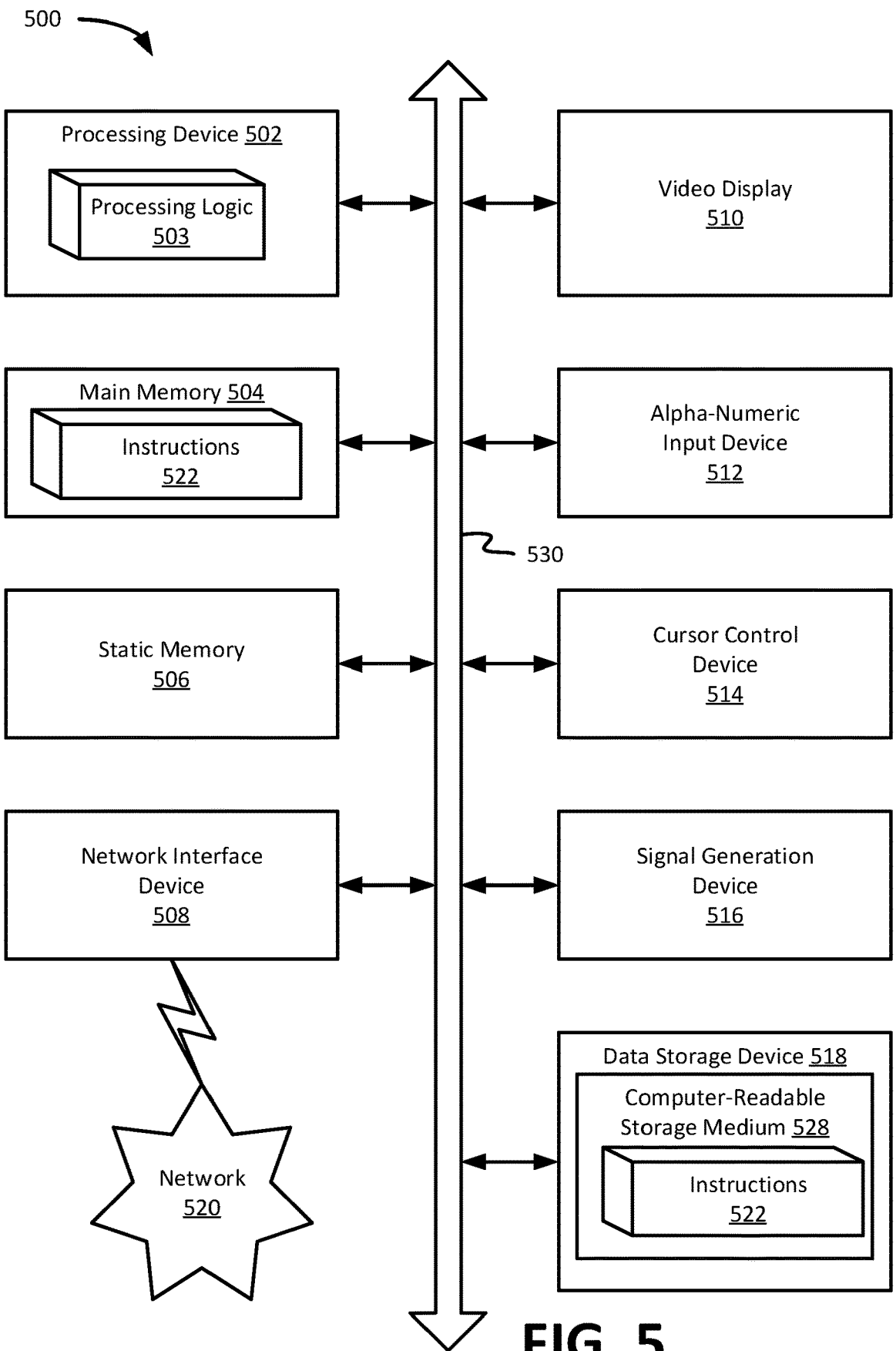
FIG. 5 is a block diagram of an example computer device within which a set of instructions, for causing the machine to perform any of the one or more methodologies discussed herein can be executed, in accordance with some implementations of the disclosure.

FIG. 5 depicts a block diagram of an example computer device 500 within which a set of instructions, for causing the machine to perform any of the one or more methodologies discussed herein can be executed, in accordance with some implementations of the disclosure. Example computer device 500 can be connected to other computer devices in a LAN, an intranet, an extranet, and/or the Internet. Computer device 500 can operate in the capacity of a server in a client-server network environment. Computer device 500 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" includes any collection of computers that individually or jointly execute a set (or multiple sets) of instructions to perform any one or more of the methods discussed herein. In some implementations, the AV 100 includes the computer device 500).

Example computer device 500 can further comprise a network interface device 508, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Processing device 502 represents one or more general-purpose processing devices such as a microprocessor, central processing unit, or the like. More particularly, processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. In accordance with one or more aspects of the disclosure, processing device 502 can be configured to execute instructions performing any of the operations performed by the AV 100 and/or the system 220.

Example computer device 500 can further comprise a network interface device 808, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 can include a computer-readable storage medium (or, more specifically, a non-transitory computer-readable storage medium) 528 on which is stored one or more sets of executable instructions 522. In accordance with one or more aspects of the disclosure, executable instructions 522 can comprise executable instructions to perform any of the operations of the AV 100 and/or the system 220.

Executable instructions 522 can also reside, completely or at least partially, within main memory 504 and/or within processing device 502 during execution thereof by example computer device 500, main memory 504 and processing device 502 also constituting computer-readable storage media. Executable instructions 522 can further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" includes any medium that is capable of storing or encoding a set of instructions for execution by the machine that cause the machine to perform any one or more of the methods described herein. The term "computer-readable storage medium" includes, but is not limited to, solid-state memories, and optical and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation," "one implementation," "some implementations," "an implementation," "one implementation," "some implementations," or the like throughout may or may not mean the same implementation or implementation. One or more implementations or implementations described herein may be combined in a particular implementation or implementation. The terms "first," "second," "third," "fourth," etc. as used herein are meant as labels to distinguish among different elements and may not necessarily have an ordinal meaning according to their numerical designation.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled to the memory device, to perform operations comprising:
obtaining road patch type data associated with at least one road patch type of road portions of a road in a driving environment of an autonomous vehicle (AV);
deriving, from the road patch type data, a set of road patch type parameters for the at least one road patch type, wherein the set of road patch type parameters for the at least one road patch type are based at least in part on lengths of a plurality of road portions of a particular road patch type of the at least one road patch type;
generating, based on the set of road patch type parameters, a set of risk metrics, each risk metric of the set of risk metrics corresponding to a respective road patch type parameter of the set of road patch type parameters;
identifying, based at least in part on the set of risk metrics, a set of AV motion planning constraints selected for the at least one road patch type; and
providing the set of AV motion planning constraints to update motion planning functionality performed by at least one component of the AV, wherein the set of AV motion planning constraints minimizes risk during autonomous operation of the AV for the at least one road patch type.

2. The system of claim 1, wherein the at least one road patch type corresponds to at least one respective non-standard road state.

3. The system of claim 2, wherein the at least one road patch type comprises at least one of: a wet road patch, an icy road patch, a snowy road patch, a dirt road patch, or a gravel road patch.

4. The system of claim 1, wherein the set of road patch type parameters for the at least one road patch type comprises a set of length frequencies, each length frequency of the set of length frequencies corresponding to a rate of occurrence of a respective length or a respective length range of the at least one road patch type.

5. The system of claim 4, wherein generating the set of risk metrics comprises determining, for each length frequency of the set of length frequencies, a respective risk value.

6. The system of claim 1, wherein the set of AV motion planning constraints comprises at least one of: a coefficient of friction, or a set of dynamic constraints.

7. The system of claim 1, wherein:
the operations further comprise obtaining auxiliary data for identifying the set of AV motion planning constraints; and
the set of AV motion planning constraints is identified based on the set of risk metrics and the auxiliary data.

8. The system of claim 7, wherein the auxiliary data comprises at least one of: a set of historical AV motion planning constraints, a historical rate of encountering other agents within a driving environment, or weather information.

9. A method comprising:
obtaining, by a processing device, road patch type data associated with at least one road patch type of road portions of a road in a driving environment of an autonomous vehicle (AV);
deriving, by the processing device from the road patch type data, a set of road patch type parameters for the at least one road patch type, wherein the set of road patch type parameters for the at least one road patch type are based at least in part on lengths of a plurality of road portions of a particular road patch type of the at least one road patch type;
generating, by the processing device based on the set of road patch type parameters, a set of risk metrics, each risk metric of the set of risk metrics corresponding to a respective road patch type parameter of the set of road patch type parameters;
identifying, by the processing device based at least in part on the set of risk metrics, a set of AV motion planning constraints selected for the at least one road patch type; and
providing, by the processing device, the set of AV motion planning constraints to update motion planning functionality performed by at least one component of the AV, wherein the set of AV motion planning constraints minimizes risk during autonomous operation of the AV for the at least one road patch type.

10. The method of claim 9, wherein the at least one road patch type corresponds to at least one respective non-standard road state.

11. The method of claim 10, wherein the at least one road patch type comprises at least one of: a wet road patch, an icy road patch, a snowy road patch, a dirt road patch, or a gravel road patch.

12. The method of claim 9, wherein the set of road patch type parameters for the at least one road patch type comprises a set of length frequencies, each length frequency of the set of length frequencies corresponding to a rate of occurrence of a respective length or a respective length range of the at least one road patch type.

13. The method of claim 12, wherein generating the set of risk metrics comprises determining, for each length frequency of the set of length frequencies, a respective risk value.

14. The method of claim 9, wherein the set of AV motion planning constraints comprises at least one of: a coefficient of friction, or a set of dynamic constraints.

15. The method of claim 9, further comprising:
   obtaining, by the processing device, auxiliary data for identifying the set of AV motion planning constraints;
   wherein identifying the set of AV motion planning constraints comprises identifying the set of AV motion planning constraints based on the set of risk metrics and the auxiliary data.

16. The method of claim 15, wherein the auxiliary data comprises at least one of: a set of historical AV motion planning constraints, a historical rate of encountering other agents within a driving environment, or weather information.

17. A non-transitory computer-readable storage medium having instructions stored thereon that, when executed by a processing device, cause the processing device to perform operations comprising:
   obtaining road patch type data associated with at least one road patch type corresponding to at least one respective non-standard road state;
   deriving, from the road patch type data, a set of road patch type parameters for the at least one road patch type, wherein the set of road patch type parameters for the at least one road patch type comprises a set of length frequencies, each length frequency of the set of length frequencies corresponding to a rate of occurrence of a respective length or a respective length range of the at least one road patch type;
   generating, based on the set of road patch type parameters, a set of risk metrics, each risk metric of the set of risk metrics corresponding to a respective road patch type parameter of the set of road patch type parameters, wherein generating the set of risk metrics comprises determining a respective risk value for each length frequency of the set of length frequencies;
   identifying, based at least in part on the set of risk metrics, a set of autonomous vehicle (AV) motion planning constraints selected for the at least one road patch type, wherein the set of AV motion planning constraints comprises at least one of: a coefficient of friction, or a set of dynamic constraints; and
   providing the set of AV motion planning constraints to update motion planning functionality performed by at least one component of an AV, wherein the set of AV motion planning constraints minimizes risk during autonomous operation of the AV for the at least one road patch type.

18. The non-transitory computer-readable storage medium of claim 17, wherein the at least one road patch type comprises at least one of: a wet road patch, an icy road patch, a snowy road patch, a dirt road patch, or a gravel road patch.

19. The non-transitory computer-readable storage medium of claim 17, wherein:
   the operations further comprise obtaining auxiliary data for identifying the set of AV motion planning constraints; and
   identifying the set of AV motion planning constraints comprises identifying the set of AV motion planning constraints based on the set of risk metrics and the auxiliary data.

20. The non-transitory computer-readable storage medium of claim 19, wherein the auxiliary data comprises at least one of: a set of historical AV motion planning constraints, a historical rate of encountering other agents within a driving environment, or weather information.

* * * * *